United States Patent
Xiong et al.

(10) Patent No.: US 9,431,893 B1
(45) Date of Patent: Aug. 30, 2016

(54) STABILITY CONTROL OF A POWER FACTOR CORRECTION CIRCUIT USING ADAPTIVE MULITPLIER VOLTAGE FEEDBACK

(71) Applicant: Universal Lighting Technologies, Inc., Madison, AL (US)

(72) Inventors: Wei Xiong, Madison, AL (US); Candice Ungacta, Huntsville, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 250 days.

(21) Appl. No.: 14/096,402

(22) Filed: Dec. 4, 2013

Related U.S. Application Data

(60) Provisional application No. 61/733,462, filed on Dec. 5, 2012.

(51) Int. Cl.
*H05B 37/00* (2006.01)
*H02M 1/42* (2007.01)
*H05B 37/02* (2006.01)

(52) U.S. Cl.
CPC ........... *H02M 1/4208* (2013.01); *H05B 37/02* (2013.01)

(58) Field of Classification Search
CPC .................. H05B 33/0815; H05B 33/0803
USPC ........ 315/200 R, 307, 185 R, 186, 112, 171, 315/193, 201, 247, 209 R, 219
See application file for complete search history.

(56) References Cited

U.S. PATENT DOCUMENTS

| | | | | |
|---|---|---|---|---|
| 2010/0308733 A1* | 12/2010 | Shao | .................. | H02M 1/4225 315/119 |
| 2011/0292704 A1* | 12/2011 | Makino | ............... | H02M 1/4208 363/126 |

* cited by examiner

*Primary Examiner* — Lincoln Donovan
*Assistant Examiner* — Thomas Skibinski
(74) *Attorney, Agent, or Firm* — Patterson Intellectual Property Law, P.C.; Mark J. Patterson

(57) ABSTRACT

A power factor correction (PFC) circuit includes an adaptive multiplier feedback control circuit to enhance stability of the PFC circuit for high input voltage and low input power (i.e., low input current) conditions. The adaptive multiplier feedback control circuit controls a voltage provided to a multiplier voltage input of a controller of the PFC circuit. The controller determines control loop gain as a function of the voltage at the multiplier voltage input terminal of the controller. The adaptive multiplier feedback control circuit increases the voltage at the multiplier voltage input of the controller is the input current to the PFC circuit increases. The PFC circuit may be used in an AC to DC converter of the driver circuit of a light fixture operable to provide power to a light source of the light fixture.

17 Claims, 2 Drawing Sheets

STABILITY CONTROL OF A POWER FACTOR CORRECTION CIRCUIT USING ADAPTIVE MULITPLIER VOLTAGE FEEDBACK

CROSS-REFERENCES TO RELATED APPLICATIONS

This application claims priority to and hereby incorporates by reference in its entirety U.S. Provisional Patent Application Ser. No. 61/733,462 filed Dec. 5, 2012 entitled "STABILITY CONTROL OF A POWER FACTOR CORRECTION CIRCUIT USING ADAPTIVE MULTIPLIER VOLTAGE FEEDBACK."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to power factor correction (PFC) circuits for alternating current (AC) to direct current (DC) power converters. More particularly, this invention pertains to stabilizing operation of a PFC circuit of an AC to DC converter for a wide range of operating conditions.

Referring to FIG. 1, an AC to DC power converter 100 includes a simple multiplier circuit 102 as part of a PFC circuit 104. Typically, the control loop for a critical conduction mode PFC circuit 104 can be optimized easily if the input voltage has a maximum up to triple the minimum of the input voltage as long as the output power of the PFC circuit 104 is fixed. When the input power (i.e., input voltage and input current product) changes dramatically, for example, from 110 w to 5 w, the PFC circuit 104 tends to lack stability at high input voltage and low input current. Control loop gain is determinative of control loop stability for the PFC circuit 104. PFC circuit multiplier gain is a factor in this loop gain. Equation 1 shows a general transfer function between control to output for a PFC circuit block.

$$G_{c\_o}(s) = K_p \times G1(s) \qquad \text{EQUATION 1:}$$

In Equation 1, $K_P$ is the multiplier gain which is defined by $(R2 \ast Vin)/R1$. $G1(s)$ is the open loop control to output transfer function without multiplier gain. $G_{c\_o}(s)$ is the open loop input to output transfer function accounting for the multiplier gain. Generally, the higher the gain, the less stable a control loop will be.

In the prior art PFC circuit 104 of FIG. 1, the PFC circuit 104 further includes a controller 106 having a multiplier voltage input 108. The controller 106 determines the multiplier gain (i.e., loop gain) as a function of the voltage at the multiplier voltage input 108. The conventional simple multiplier circuit 102 provides the multiplier voltage via a resistive divider formed by resistors R1 and R2. The multiplier voltage thus changes in direct proportion to the input voltage. The multiplier is relatively low when input voltage Vin is relatively low and relatively high when the input voltage Vin to the PFC circuit 104 is relatively high.

When the input power is relatively low and the input voltage Vin is relatively high, the multiplier circuit 102 cannot meet the stability requirement, i.e., the multiplier or gain is higher when it needs to be lower at high input voltage Vin. An ideal multiplier circuit design should provide a lower voltage to the multiplier voltage input 108 of the controller 106 when input voltage Vin increases and input power decreases (i.e., input current decreases) to maintain stability over an increased range of operating conditions.

BRIEF SUMMARY OF THE INVENTION

Aspects of the present invention provide an adaptive multiplier voltage feedback control for a PFC circuit of an AC to DC converter. A multiplier voltage feedback circuit adjusts a gain of the PFC circuit as a function of an input current and input voltage of the AC to DC converter.

In one aspect, an adaptive multiplier feedback control circuit of a PFC circuit includes a current sensor and an output stage. The current sensor is operable to sense current of the PFC circuit. The output stage is operable to provide a multiplier voltage to the PFC circuit. The provided multiplier voltage is directly related to the current of the PFC circuit.

In another aspect, an AC to DC power converter includes a rectifier and a PFC circuit. The rectifier is operable to receive power from an AC power supply and provide a rectified voltage. The PFC circuit receives the rectified voltage and provides an output voltage and current. The PFC circuit includes an adaptive multiplier feedback control circuit. The adaptive multiplier feedback control circuit includes a current sensor and an output stage. The current sensor senses current of the PFC circuit. The output stage provides a multiplier voltage to the PFC circuit. The provided multiplier voltage is directly related to the current of the PFC circuit.

In another aspect of the present invention, a light fixture includes a light source, a driver circuit, and a housing. The light source provides light in response to receiving power. The driver circuit provides power from a power source to the light source. The housing supports the light source and the driver circuit. The driver circuit includes an AC to DC power converter and a DC to DC converter. The AC to DC power converter includes a rectifier and a PFC circuit. The rectifier receives power from an AC power supply and provides a rectified voltage. The PFC circuit receives the rectified voltage and provides an output voltage and current. The PFC circuit includes an adaptive multiplier feedback control circuit. The adaptive multiplier feedback control circuit includes a current sensor and an output stage. The current sensor senses current of the PFC circuit. The output stage provides a multiplier voltage to the PFC circuit. The provided multiplier voltage is directly related to the current of the PFC circuit. The DC to DC converter receives the output voltage and current from the PFC circuit and provides power to the light source.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" or "coupled" means directly or indirectly electrically connected when referring to electrical devices in circuit schematics or diagrams.

Figure 1:
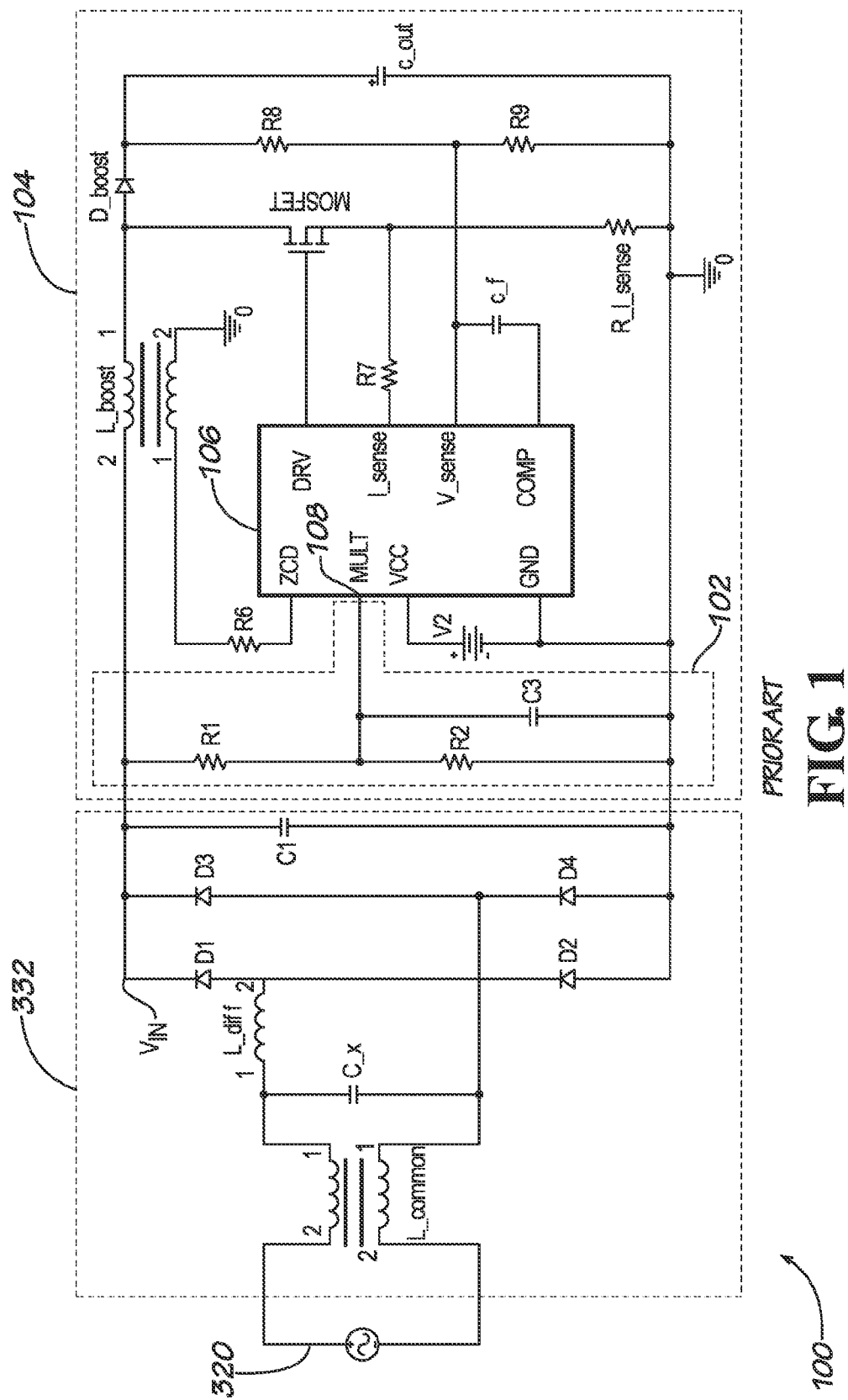
FIG. 1 is a partial schematic of a prior art power factor correction circuit with a simple multiplier voltage circuit.
Figure 2:
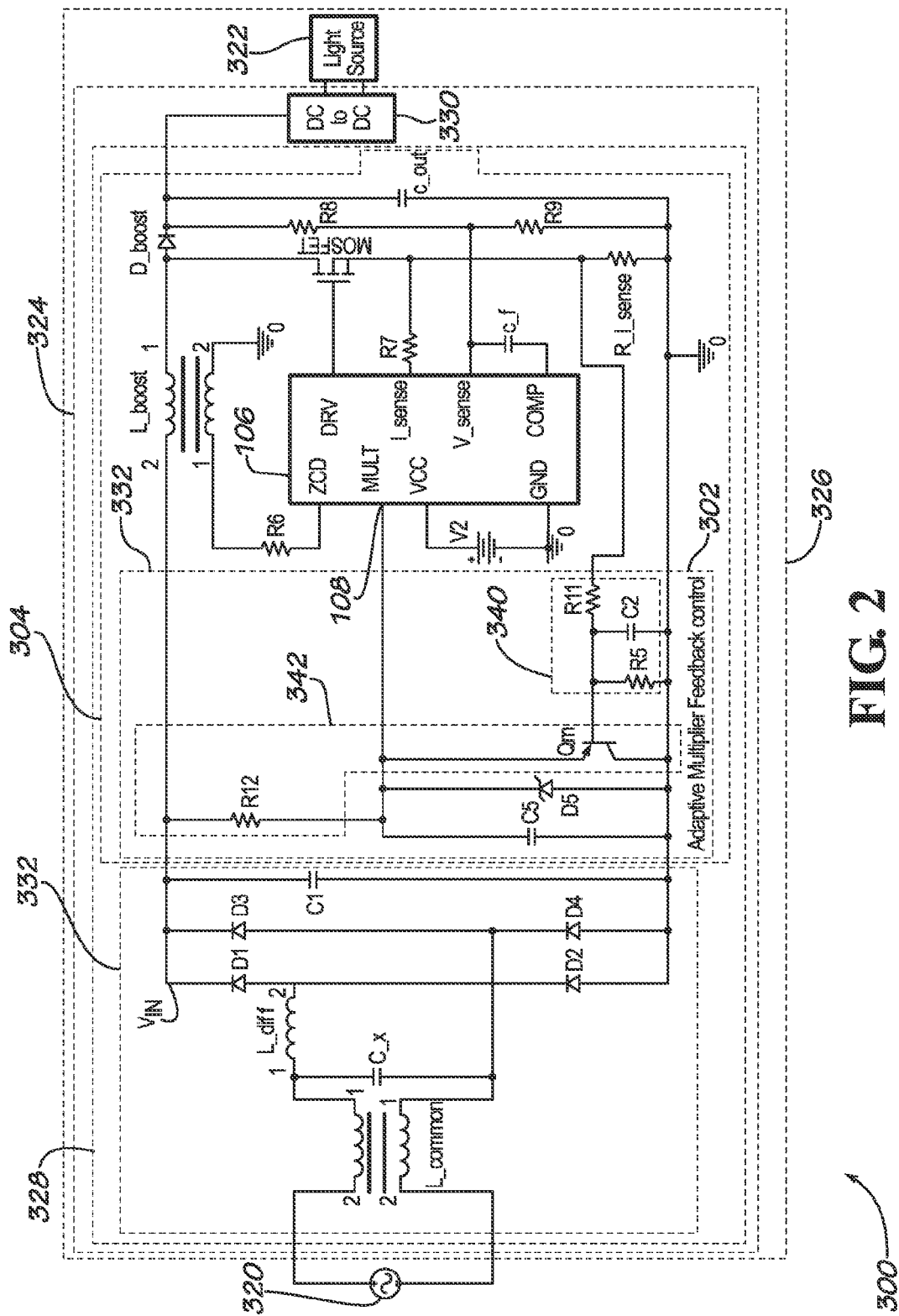
FIG. 2 is a schematic of a power factor correction circuit having an adaptive voltage feedback control circuit.

Referring to FIG. 2, an embodiment of a PFC circuit 304 in accordance with one aspect of the invention is shown. An ideal multiplier feedback voltage at the multiplier voltage input 108 of controller 106 is shown in Equation 2:

$$V_{mult} = V_{ref} \cdot |\sin(wt)| \times \frac{K_{in}}{V_{in}} \times K_{power} \times P_{out} \quad \text{EQUATION 2}$$

In Equation 2, $V_{mult}$ is the voltage at the multiplier voltage input 108 of the controller 106, which is a rectified sinusoid waveform. $V_{ref}$ is a reference voltage (e.g., V2 or VCC). $K_{in}$ is the gain applied to $V_{in}$. $V_{in}$ is the DC value of the rectified input voltage. $P_{out}$ is output power of the PFC circuit 304. $K_{power}$ is the gain of output power sensing $P_{out}$.

From Equation 2, $V_{mult}$ decreases when input voltage ($V_{in}$) increases and output power decreases, which increases the stability of the PFC circuit 304.

Simplifying Equation 2 by combining gain constants and cancelling out instances of Vin yields Equation 3.

$$V_{mult} = K_{mult} \cdot I_{in} \cdot |\sin(wt)| \quad \text{EQUATION 3:}$$

In Equation 3, $K_{mult}$ is the total gain of the multiplier feedback loop and $I_{in}$ is the average input current to the PFC circuit 304.

In FIG. 2, zener diode D5 is used to limit the voltage at the multiplier voltage input 108 of the controller 106 of the PFC circuit 304. The voltage of R_I_sense is fed back and filtered out by input resistor R11 and filter capacitor C2. The voltage cross filter capacitor C2 is a voltage proportional to the input current $I_{in}$ and is used by adaptive input multiplier circuit 332 as representative of the input current for determining the voltage provided to the multiplier voltage input 108 of the controller 106. In one embodiment, a transistor Qm is a PNP type (i.e., p-type) bipolar junction transistor (BJT) acting as a impedance amplifier. In another embodiment, the transistor Qm is a MOSFET. When the voltage across filter capacitor C2 is high, the emitter to base voltage of the transistor Qm is low so that the impedance of the transistor Qm is high.

The impedance of Qm can be approximated as shown in Equation 4.

$$R_{Qm} = G \cdot I_{in} \quad \text{EQUATION 4:}$$

In Equation 4, G is the impedance gain of the p-type transistor Qm and $I_{in}$ is the input current to the PFC circuit 304.

$V_{mult}$ can be approximately represented by Equation 5 below.

$$V_{mult} = \frac{R_{Qm}}{R1} \cdot |\sin(wt)| = \frac{G \cdot I_{in}}{R1} \cdot |\sin(wt)|$$

In Equation 5, if G/R1 is selected to be equal $K_{mult}$, then Equation 5 is equivalent to Equation 3. Thus, the adaptive multiplier voltage feedback control circuit 302 improves the stability of the PFC circuit 304 under a wider range of operating conditions (e.g., high input voltage $V_{in}$ and low input or output current $I_{in}$).

Referring again to FIG. 2, a light fixture 300 is connected to an AC power supply 320. The light fixture 300 includes a light source 322 a driver circuit 324, and a housing 326. The light source 322 provides light in response to receiving power. The housing 326 supports the light source 322 and the driver circuit 324. The driver circuit 324 provides power from a power source 320 to the light source 322. The driver circuit includes an AC to DC power converter 328 and a DC to DC converter 330. The AC to DC power converter 328 includes a rectifier 332 and the PFC circuit 304. The rectifier 332 receives power from the AC power supply 320 and provides a rectified voltage (i.e., Vin). The PFC circuit 304 receives the rectified voltage and provides an output voltage and current. The PFC circuit 304 includes an adaptive multiplier feedback control circuit 302. The adaptive multiplier feedback control circuit 302 includes a current sensor 340 and an output stage 342.

The current sensor 340 senses current (e.g., an input current Iin) of the PFC circuit 304. In one embodiment, the current sensor 340 senses an output current to the PFC circuit 304, and the output current of the PFC circuit 304 is representative of the input current of the PFC circuit 304. In one embodiment, the current sensor 340 includes a pull-down resistor R5, an input resistor R11, and a filter capacitor C2. The pull-down resistor R5 is connected between the output stage 342 and the ground of the PFC circuit 304. The input resistor R11 is connected between an output current sensing resistor R_I_sense of the PFC circuit 304 and the pull-down resistor R5. The filter capacitor C2 is connected in parallel with the pull-down resistor R5.

The output stage 342 provides a multiplier voltage to the PFC circuit 304. The provided multiplier voltage is directly related (e.g., directly proportional) to the current (e.g., Iin) of the PFC circuit 304. In one embodiment, the output stage 342 includes a pull-up resistor R12 and a transistor Qm. In one embodiment, the transistor Qm is a p-type bipolar junction transistor. The pull-up resistor R12 is connected between a positive input (e.g., Vin) of the PFC circuit 304 and the multiplier voltage input 108 of the controller 106 of the PFC circuit 304. The transistor Qm has a first terminal connected to the multiplier voltage input 108 of the controller 106 of the PFC circuit 304, a second terminal connected to the ground of the PFC circuit 304, and a control terminal connected to the output current sensing resistor R_I_sense of the PFC circuit 304 via the input resistor R11 of the adaptive multiplier feedback control circuit 302.

In one embodiment, the adaptive multiplier feedback control circuit 302 further includes a voltage limiter D5 and a multiplier voltage filter C5. The voltage limiter D5 is connected between the multiplier voltage input 108 of the controller 106 of the PFC circuit 304 and the ground of the PFC circuit 304. In one embodiment, the voltage limiter D5 may be a zener diode. The multiplier voltage filter C5 is connected between the multiplier voltage input 108 of the controller 106 of the PFC circuit 304 and the ground of the PFC circuit 304. In one embodiment, the multiplier voltage filter C5 is a capacitor.

In one embodiment, the controller 106 of the PFC circuit 304 determines the control loop gain of the PFC circuit 304 as a function of the multiplier voltage (i.e., the voltage at the multiplier voltage input 108 of the controller 106).

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful STABILITY CONTROL OF A POWER FACTOR CORRECTION CIRCUIT USING ADAPTIVE MULTIPLIER VOLTAGE FEEDBACK it is not intended that such references be construed as limitations upon the scope of this invention except as set forth in the following claims.

What is claimed is:

1. An adaptive multiplier feedback control circuit for a power factor correction (PFC) circuit, said adaptive multiplier feedback control circuit comprising:
    a current sensor operable to sense a current of the PFC circuit;
    an output stage operable to provide a multiplier voltage to the PFC circuit, wherein the provided multiplier voltage is directly related to the current of the PFC circuit;
    the PFC circuit includes a ground, a positive input, output current sensing resistor, and a controller having a multiplier voltage input; and
    the output stage comprises
        a pull-up resistor coupled between the positive input of the PFC circuit and the multiplier voltage input of the controller of the PFC circuit, and
        a p-type transistor having a first terminal coupled to the multiplier voltage input of the controller of the PFC circuit, a second terminal coupled to the ground of the PFC circuit, and a control terminal coupled to the output current sensing resistor of the PFC circuit, wherein the control terminal is coupled to the output current sensing resistor of the PFC circuit via an input resistor of the adaptive multiplier feedback control circuit.

2. The adaptive multiplier feedback control circuit of claim 1, wherein:
    the current of the PFC circuit sensed by the current sensor is an output current of the PFC circuit; and
    the output current of the PFC circuit is representative of an input current of the PFC circuit.

3. The adaptive multiplier feedback control circuit of claim 1, wherein:
    the current sensor comprises
        a pull-down resistor coupled between the output stage and the ground of the PFC circuit,
        the output current sensing resistor,
        the input resistor coupled between the output current sensing resistor of the PFC circuit and the pull down resistor, and
        a filter capacitor coupled in parallel with the pull-down resistor.

4. The adaptive multiplier feedback control circuit of claim 1, further comprising:
    a zener diode coupled between the multiplier voltage input of the controller of the PFC circuit, and the ground of the PFC circuit; and
    a filter capacitor coupled between the multiplier voltage input of the controller of the PFC circuit and the ground of the PFC circuit.

5. The adaptive multiplier feedback control circuit of claim 1, wherein:
    the multiplier voltage is provided to the multiplier voltage input of the controller of the PFC circuit, and the PFC circuit determines a control loop gain as a function of the multiplier voltage.

6. The adaptive multiplier feedback control circuit of claim 1, further comprising an alternating current (AC) to direct current (DC) power converter, wherein the AC to DC power converter comprises the PFC circuit.

7. The adaptive multiplier feedback control circuit of claim 1, further comprising:
    a light fixture comprising
        a light source functional to provide light in response to receiving power, and
        a driver circuit functional to provide power from a power source to the light source, wherein
            the driver circuit comprises an alternating current (AC) to direct current (DC) power converter, and
            the AC to DC power converter comprises the PFC circuit; and
        a housing operable to support the light source and the driver circuit.

8. An alternating current (AC) to direct current (DC) power converter comprising:
    a rectifier operable to receive power from an AC power supply and provide a rectified voltage;
    a power factor correction (PFC) circuit coupled to receive the rectified voltage and functional to provide an output voltage and current, said PFC circuit comprising
        an adaptive multiplier feedback control circuit comprising,
            a current sensor operable to sense a current of the PFC circuit, and
            an output stage operable to provide a multiplier voltage to the PFC circuit, wherein the provided multiplier voltage is directly related to the current of the PFC circuit; and
        wherein the output stage comprises
            a pull-up resistor coupled between a positive input of the PFC circuit and a multiplier voltage input of a controller of the PFC circuit, and
            a p-type transistor having a first terminal coupled to the multiplier voltage input of the controller of the PFC circuit, a second terminal coupled to a ground of the PFC circuit, and a control terminal coupled to an output current sensing resistor of the PFC circuit via an input resistor of the adaptive multiplier feedback control circuit.

9. The AC to DC power converter of claim 8, wherein:
    the current of the PFC circuit sensed by the current sensor is an output current of the PFC circuit; and
    the output current of the PFC circuit is representative of an input current of the PFC circuit.

10. The AC to DC power converter of claim 8, wherein the current sensor comprises:
    a pull-down resistor coupled between the output stage and the ground of the PFC circuit;
    the input resistor coupled between the output current sensing resistor of the PFC circuit and the pull down resistor; and
    a filter capacitor coupled in parallel with the pull down resistor.

11. The AC to DC power converter of claim 8, further comprising:
    a zener diode coupled between the multiplier voltage input of the controller of the PFC circuit and the ground of the PFC circuit; and
    a filter capacitor coupled between the multiplier voltage input of the controller of the PFC circuit and the ground of the PFC circuit, wherein the multiplier voltage filter comprises a capacitor.

12. The AC to DC power converter of claim 8, wherein:
    the multiplier voltage is coupled to the multiplier voltage input of the controller of the PFC circuit, and the PFC circuit is effective to determine a control loop gain as a function of the multiplier voltage.

13. A light fixture comprising:
a light source operable to provide light in response to receiving power;
a driver circuit operable to provide power from a power source to the light source;
the driver circuit comprises an alternating current (AC) to direct current (DC) power converter;
the AC to DC converter comprises
 a rectifier operable to receive power from an AC power supply and provide a rectified voltage, and
 a power factor correction (PFC) circuit operable to receive the rectified voltage and provide an output voltage and current;
the PFC circuit comprises an adaptive multiplier feedback control circuit;
the adaptive multiplier feedback control circuit comprises
 a current sensor operable to sense a current of the PFC circuit;
  an output stage operable to provide a multiplier voltage to the PFC circuit, wherein the provided multiplier voltage is directly related to the current of the PFC circuit;
a DC to DC converter operable to receive the output voltage and current from the PFC circuit and provide power to the light source; and
a housing configured to support the light source and the driver circuit; and
wherein the output stage comprises
 a pull up resistor coupled between a positive input of the PFC circuit and a multiplier voltage input of a controller of the PFC circuit, and
 a p-type transistor having a first terminal coupled to the multiplier voltage input of the controller of the PFC circuit, a second terminal coupled to a ground of the PFC circuit, and a control terminal coupled to an output current sensing resistor of the PFC circuit, wherein the control terminal is coupled to the output current sensing resistor of the PFC circuit via an input resistor of the adaptive multiplier feedback control circuit.

14. The light fixture of claim 13, wherein:
the current of the PFC circuit sensed by the current sensor is an output current of the PFC circuit; and
the output current of the PFC circuit is representative of an input current of the PFC circuit.

15. The light fixture of claim 13, wherein the current sensor comprises:
a pull-down resistor coupled between the output stage and the ground of the PFC circuit;
the input resistor coupled between the output current sensing resistor of the PFC circuit and the pull down resistor; and
a filter capacitor coupled in parallel with the pull down resistor.

16. The light fixture of claim 13, further comprising:
a zener diode coupled between the multiplier voltage input of the controller of the PFC circuit, and the ground of the PFC circuit; and
a filter capacitor coupled between the multiplier voltage input of the controller of the PFC circuit and the ground of the PFC circuit.

17. The light fixture of claim 13, wherein:
the PFC circuit further comprises the controller;
the multiplier voltage is provided to the multiplier voltage input the controller of the PFC circuit; and
the PFC circuit determines a control loop gain as a function of the multiplier voltage.

* * * * *